(12) United States Patent  
Easty

(10) Patent No.: US 9,325,514 B1  
(45) Date of Patent: Apr. 26, 2016

(54) APPARATUS FOR MANAGING LOCAL DEVICES

(75) Inventor: Allen Easty, Katy, TX (US)

(73) Assignee: Mesh Networks, LLC, Houston, TX (US)

( * ) Notice: Subject to any disclaimer, the term of this patent is extended or adjusted under 35 U.S.C. 154(b) by 63 days.

(21) Appl. No.: 13/415,002

(22) Filed: Mar. 8, 2012

(51) Int. Cl.  
*G06F 15/173* (2006.01)  
*H04L 12/26* (2006.01)

(52) U.S. Cl.  
CPC .................... *H04L 12/2618* (2013.01)

(58) Field of Classification Search  
USPC .......................................... 709/224  
See application file for complete search history.

(56) References Cited

U.S. PATENT DOCUMENTS

| | | | |
|---|---|---|---|
| 2004/0062268 A1* | 4/2004 | Pendakur et al. | 370/465 |
| 2007/0036161 A1* | 2/2007 | Mahamuni | 370/392 |
| 2008/0168337 A1* | 7/2008 | Gaal et al. | 714/784 |
| 2008/0295158 A1* | 11/2008 | Hilving et al. | 726/5 |
| 2010/0002589 A1* | 1/2010 | Ciordas et al. | 370/241 |
| 2011/0228678 A1* | 9/2011 | Ricciulli | 370/238 |

* cited by examiner

*Primary Examiner* — El Hadji Sall  
(74) *Attorney, Agent, or Firm* — Blank Rome LLP

(57) ABSTRACT

An apparatus for managing local devices, wherein the apparatus is operatively connectable with a network to manage network traffic. The apparatus can include computer instructions to identify and track a Media Access Control identifier using the network. The apparatus can also include computer instructions to direct traffic to a path associated with the Media Access Control identifier, computer instructions to measure the bit rate passing through the path associated with the Media Access Control identifier; and computer instructions to adjust the bit rate allowed to pass through the path. The decision to adjust the bit rate allowed to pass through the path can be determined using rolling quotas.

20 Claims, 4 Drawing Sheets

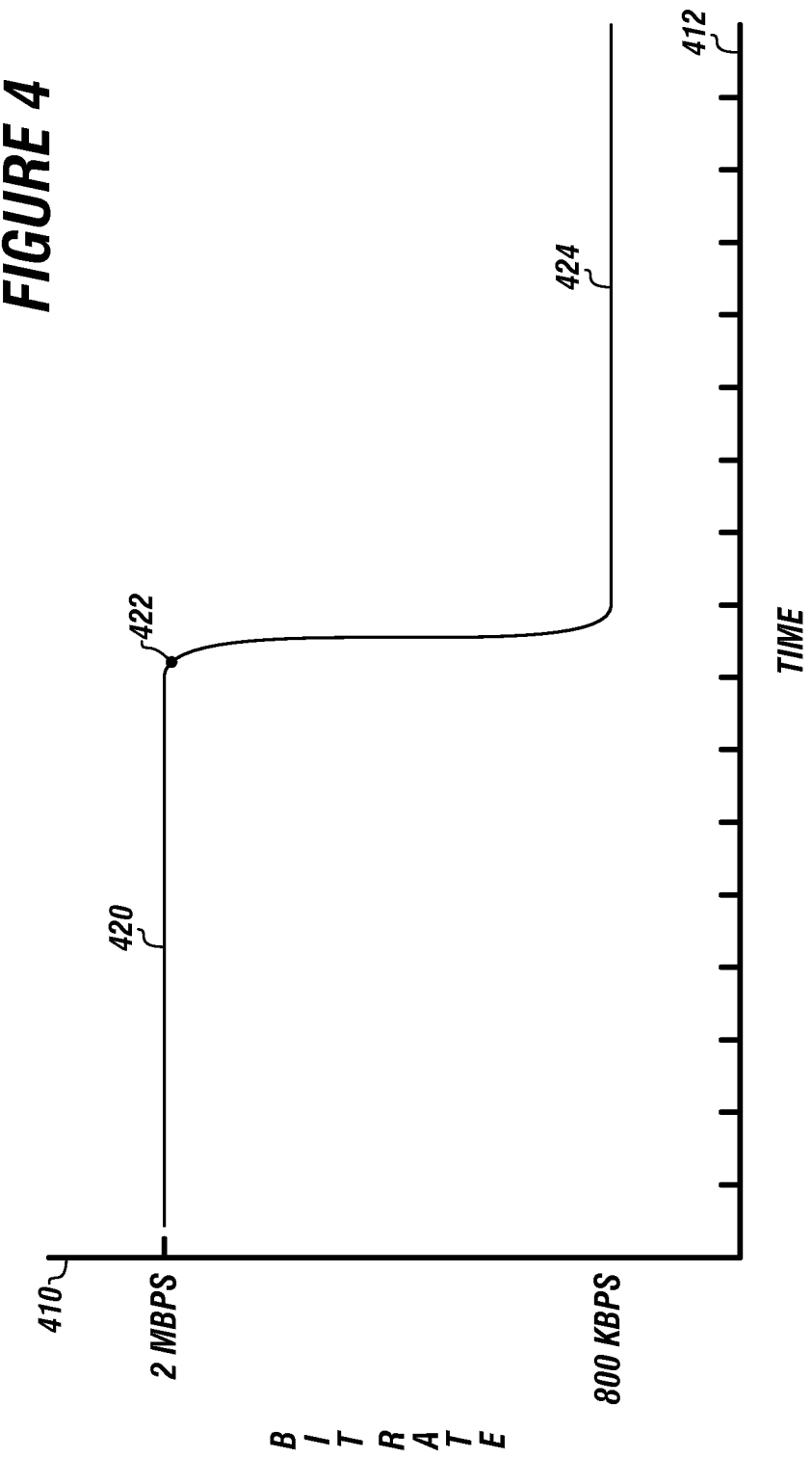

APPARATUS FOR MANAGING LOCAL DEVICES

FIELD

The present embodiments generally relate to an apparatus for managing local devices.

BACKGROUND

A need exists for an apparatus that can function as an isolated system on a local area network in an efficient inexpensive way.

A further need exists for an apparatus that can function in an unobtrusive way and manages network traffic in an efficient manner.

The present embodiments meet these needs.

BRIEF DESCRIPTION OF THE DRAWINGS

The detailed description will be better understood in conjunction with the accompanying drawings as follows:

FIG. 4 depicts a graph of a rolling quota.

Figure 1:
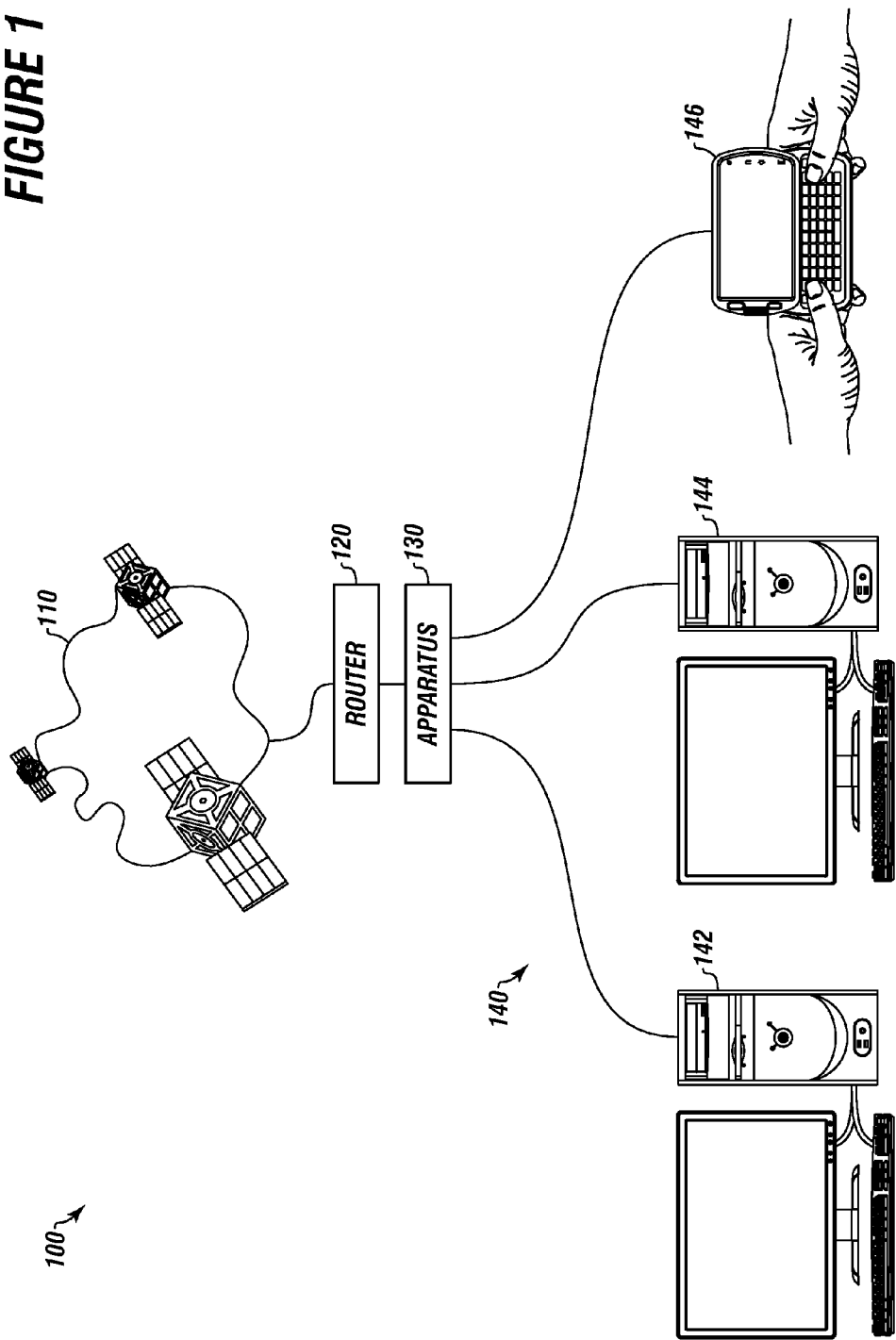
FIG. 1 depicts a schematic of a network with an apparatus for managing network traffic in communication therewith.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to an apparatus for managing local devices.

The apparatus for managing local devices can be operatively connectable with a network to manage network traffic.

The apparatus can include computer instructions to identify and track a client of a network. The apparatus can be configured to sniff and filter portions of upstream traffic for the Media Access Control (MAC) identifier, and Internet Protocol (IP) address are tracked against the Media Access Control identifier. The logic that the computer instruction to identify and track a client of the network is as follows: network client interfaces are identified by MAC address; the IP address is used to identify traffic for different levels of priority or bandwidth constraints. However, the IP address associated with a network interface thus MAC address may change. This system tracks the changes so that statistics used in determining service levels are maintained across IP addresses changes.

Accordingly, the Internet Protocol Addresses can be tracked and associated with the Media Access Control identifier.

The apparatus can include computer instructions to direct traffic to a path associated with the client. To direct traffic, the computer instructions can perform a multi-tier hashing algorithm to sort packets to quality of service queues for scalability to very large sites. The multi-tier hashing algorithm can first sort the Internet Protocol addresses based on the first set of numbers before the first period and assign the Internet Protocol addresses to appropriate first stage queue. The multi-tier hashing algorithm can perform a second sort of Internet Protocol addresses within each of the first stage queues based on the numbers of the Internet Protocol addresses that follow the first period and precede the second period and assign the Internet Protocol addresses to appropriate second stage queue. The multi-tier hashing algorithm can perform a third sort of Internet Protocol addresses within each of the second stage queues based on the numbers of the Internet Protocol addresses that follow the second period and precede the third period and assign the Internet Protocol addresses to appropriate third stage queue. The multi-tier hashing algorithm can perform a serial sort of the Internet Protocol addresses within each of the third stage queues based on the numbers of the Internet Protocol addresses that follow the third period and assign the Internet Protocol addresses to a traffic path associated with the Media Access Control identifier.

The apparatus can also include computer instructions to measure the bit rate traveling through the traffic paths associated with the Media Access Control identifier of the client. The measuring of bit rate traveling through the traffic paths can be accomplished using techniques that would be known to one skilled in the art with the aid of this disclosure. For example, data transiting the system with a sliding time window is used to make decisions in the system. The bytes counts for a given IP address are sampled on a periodic basis. A fixed number of these samples constitute the time window. A new sample is added and one discarded per each sample period. The window total is then recalculated. The apparatus can also include computer instructions to adjust the bit rate and priority of traffic on the paths associated with the Media Access Control identifier. For example, each path has queues associated on which Quality of Service algorithms supporting priorities and bit rate limits are implemented. The algorithms include (but are not limited to) Weighted Round Robin and Exponential Weighted Moving Average. The apparatus allows the ability to track network information and the ability to adjust the bit rate available to each Media Access Control identifier using rolling quotas, thereby creating fairness and preventing system abuse.

Two paths can be associated with each Media Access Control identifier. A first path can be incoming traffic and a second path can be outgoing traffic. The apparatus can include computer instructions to sniff and filter traffic in the second path. For example, outgoing data can be sniffed to provide notification of new client interfaces and their associated addresses, and outgoing data can be also sniffed to track IP address changes on existing client interfaces.

The apparatus can also include computer instructions to compile reports on the traffic associated with each Media Access Control identifier. The reports can be compiled in Extensible Markup Language (XML).

The apparatus can be configured to identify and track a plurality of Media Access Control identifiers.

The apparatus can include a management interface. The management interface can be a configuration software file that reads high limits, low limits, duration of window, ingoing network interfaces, outgoing network interfaces, quota time windows, quota threshold values. The management interface can provide a graphical representation of the high limits, low limits, duration of window, ingoing network interfaces, outgoing network interfaces, quota time windows, quota threshold values, or combinations thereof.

Turning now to the Figures, FIG. 1 depicts a schematic of a communication system with an apparatus for managing network traffic in communication therewith.

The communication system 100 can include a wide area network 110, a router 120, an apparatus 130, a local access network 140, and one or more client devices, such as a first client device 142, a second client device 144, and a third client device 146.

The wide area network 110 can be in communication with the router 120. The apparatus 130 can be connected between the router 120 and the local access network 140. The apparatus 130 can manage the amount of traffic that the first client 142, the second client device 144, and the third client device 146 are allowed to use.

Figure 2:
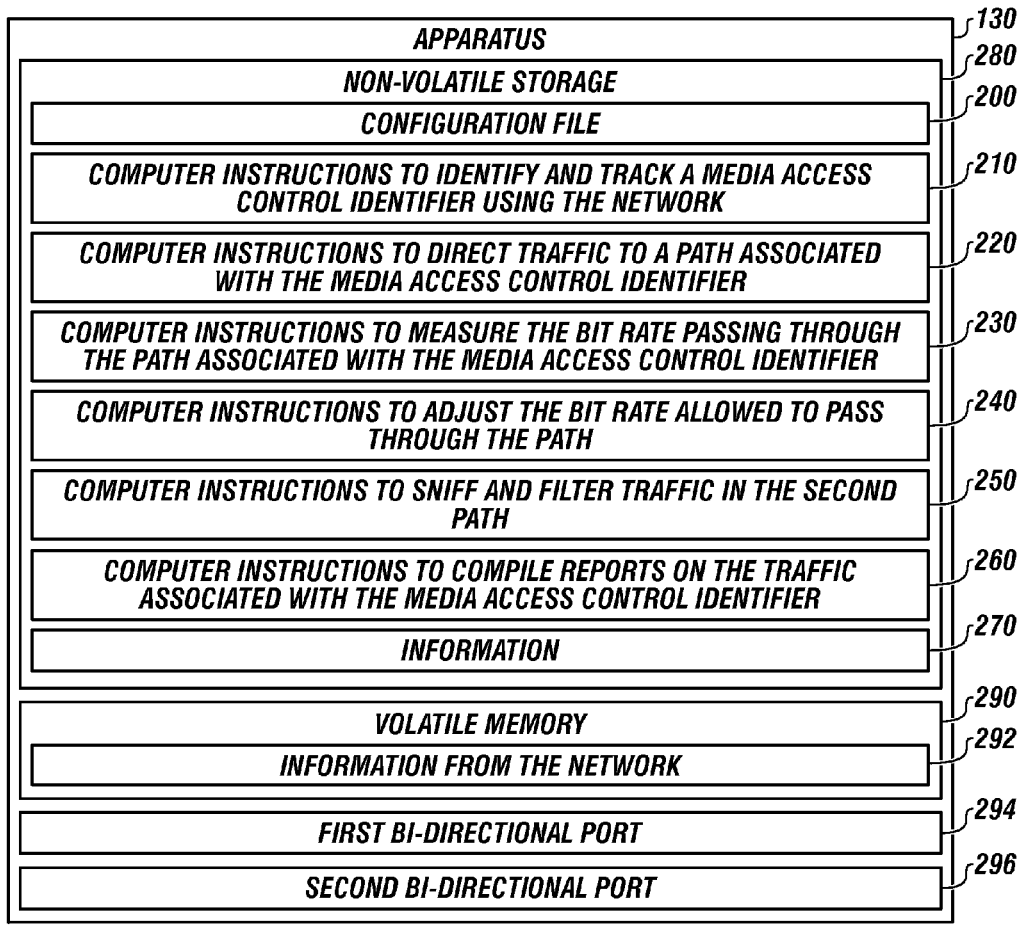
FIG. 2 depicts a schematic of the apparatus.

FIG. 2 depicts a schematic of the apparatus. The apparatus 130 can include non-volatile storage 280 that has a configuration file 200. The configuration file 200 can include computer instructions to identify and track a Media Access Control identifier using the network 210.

The non-volatile storage 280 can also include computer instructions to direct traffic to a path associated with the Media Access Control identifier 220.

The non-volatile storage 280 can include computer instructions to measure the bit rate passing through the path associated with the Media Access Control identifier 230.

The non-volatile storage 280 can also include computer instructions to adjust the bit rate allowed to pass through the path 240.

The non-volatile storage 280 can also include computer instructions to sniff and filter traffic in the second path 250.

The non-volatile storage 280 can also include computer instructions to compile reports on the traffic associated with the Media Access Control identifier 260.

The non-volatile storage 280 can also include information 270. The information can be basic network identification, normal and penalty limits, and quota window period and thresholds.

The apparatus 130 can also have volatile memory 290 that can record information from the network 292. The information Media Control Identifiers, IP addresses, and samples get totaled to calculate the quota period counts.

The apparatus 130 can also include a first bi-directional port 294 and a second bi-directional port 296. The apparatus 130 can use the network to acquire the information from the network 292. The apparatus 130 can have additional hardware, known to those skilled in the art, which allows for control of the bit rate flowing therethrough.

Figure 3:
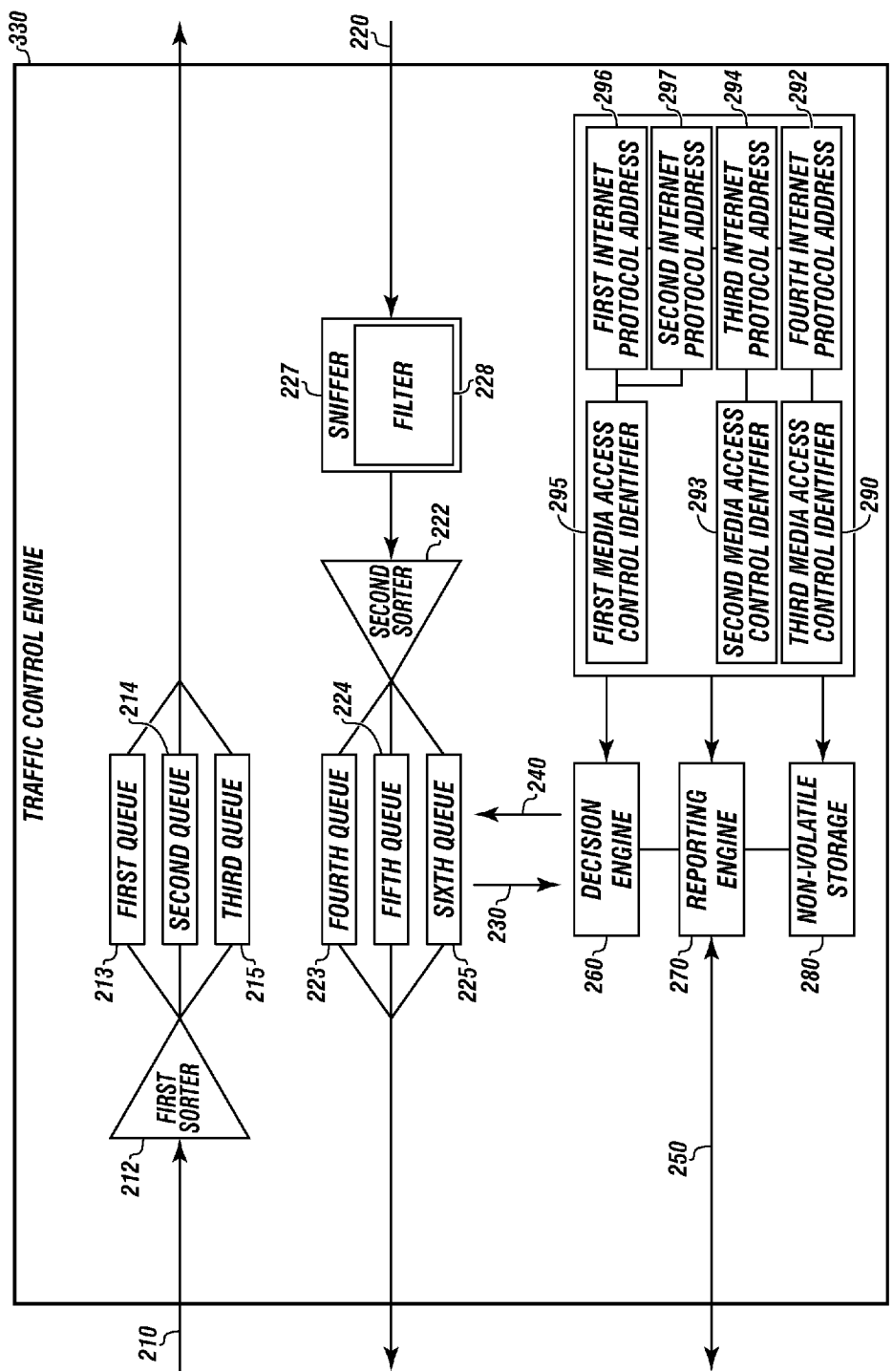
FIG. 3 depicts a schematic of a traffic control engine.

FIG. 3 depicts a schematic of a traffic control engine. The traffic control engine 330 can be formed by the computer instructions described herein.

The traffic control engine 330 can include a first path 210 and a second path 220. A first sorter 212 can sort traffic in the first path 210. The traffic in the first path 220 can be sorted into a first queue 213, a second queue 214, or a third queue 215 based on the Internet Protocol addresses associated with the traffic. The first queue 213 can be associated with a first Internet Protocol address 296 and a second Internet Protocol address 297 associated with a first Media Access Control identifier 295. The second queue 214 can be associated with a third Internet Protocol address 294 associated with a second Media Access Control identifier 293. The third queue 215 can be associated with a fourth Internet Protocol address 292 associated with a third Media Access Control identifier 290.

The traffic control engine 330 can also include a second path 220. The second path can include a sniffer 227 and a filter 228. The sniffer 227 and filter 228 can selectively inspect and filter data on Internet protocol addresses and Media Access Control identifiers associated with traffic transferred in the path. The sniffer 227 checks the IP addresses against existing MAC in the new system or new clients and their associated MAC/IPs.

A second sorter 222 can be in communication with the second path 220. The second sorter 222 can sort the traffic into a fourth queue 223, a fifth queue 224, and a sixth queue 225 based on the Internet Protocol addresses associated with the traffic. The fourth queue 223 can be associated with a first Internet Protocol address 296 and a second Internet Protocol address 297 associated with a first Media Access Control identifier 295. The fifth queue 224 can be associated with a third Internet Protocol address 294 associated with a second Media Access Control identifier 293. The sixth queue 225 can be associated with a fourth Internet Protocol address 292 associated with a third Media Access Control identifier 290.

A counter 230 can monitor and count the traffic in the queues 213, 214, 215, 223, 224, and 225. The counter 230 can transfer the acquired data to a decision engine 260. The decision engine 260 can determine if the traffic associated with the queues are above a data quota based on the data transferred thereto. The decision engine 260 can issue command 240 to decrease or increase the data allowed to be transferred through each queue 213, 214, 215, 223, 224, and 225. The decision engine 260 can make the decisions using a rolling quota.

A reporting engine 270 can store data transferred to and sent from the decision engine 260. The reporting engine 270 can send the information to a management interface 250. The information can be organized as XML or JSON and queried through a REST interface. The traffic control engine 330 can also include non-volatile storage 280.

FIG. 4 depicts a graph of a rolling quota. The graph includes a y-axis 410 and an x-axis 412. The y-axis 410 can represent the data transfer, such as in terms of bit rate. The x-axis 412 can represent time. The line maximum quota limit 420 can be 2 MBPS. At point 422 a client has exceeded the quota limit and the traffic is limited to a penalty level 424.

The usage can be calculated in intervals. The intervals can be every 15 minutes, one hour, one day or other unit of time. Usage for a quota interval, also called a window, is recalculated frequently in comparison with the quota interval—every minute for example. If the recalculated traffic count for the preceding interval exceeds the quota limit, the traffic rate limit is set to the penalty value. If in a future recalculation the traffic for the preceding interval falls below the quota limit, the traffic rate limit is set to the normal, non-penalty, value.

The rolling quota is able to punish automated traffic that is often associated with file sharing or other automated usage of data. The rolling quota can control automated file sharing without having to identify of the file sharing software. It does so by selecting quota intervals that exceed the amount of time a human will engage, or desire to engage, in continuous, high bandwidth activity. Humans that engage in high bandwidth activity for unusually long periods of time or automated software that engages in high or unlimited bandwidth activity for very long or unlimited periods of time are penalized. As the rolling quota uses only network statistics as opposed to deeper inspection of the network traffic, the systems employed can be efficient and inexpensive.

While these embodiments have been described with emphasis on the embodiments, it should be understood that within the scope of the appended claims, the embodiments might be practiced other than as specifically described herein.

What is claimed is:

1. An apparatus for managing local devices, wherein the apparatus is operatively connectable with a network to manage network traffic, wherein the apparatus comprises:
   a. a non-volatile storage which comprises:
      (i) computer instructions to track a Media Access Control identifier using the network;

(ii) computer instructions to direct network traffic to one or more paths associated with the Media Access Control identifier;

(iii) computer instructions to measure a bit rate passing through the paths associated with the Media Access Control identifier; and (iv) computer instructions to adjust the bit rate allowed to pass through the paths; and b. a traffic control engine to adjust the bit rate allowed to pass through the paths and comprises a first path of the one or more paths, a second path of the one or more paths, and a sorter, wherein the sorter is configured to sort the network traffic in the first path into one or more queues based at least on a plurality of Internet Protocol addresses associated with the network traffic.

2. The apparatus of claim 1, wherein the first path is configured to transport incoming network traffic and the second path is configured to transport outgoing network traffic.

3. The apparatus of claim 2, further comprising computer instructions to sniff and filter the network traffic in the second path.

4. The apparatus of claim 1, further comprising computer instructions to compile reports on the network traffic associated with the Media Access Control identifier.

5. The apparatus of claim 1, wherein the apparatus is configured to identify and track a plurality of second Media Access Control identifiers.

6. The apparatus of claim 5, wherein the apparatus is configured to sort the network traffic into a plurality of manageable paths associated with the second Media Access Control identifiers.

7. The apparatus of claim 5, wherein the apparatus is configured to determine the network traffic associated with each of the second Media Access Control identifiers.

8. The apparatus of claim 6, wherein the apparatus is configured to determine the bit rate traveling through each of the manageable paths.

9. The apparatus of claim 6, wherein the apparatus is configured to apply a rolling quota to each of the manageable paths.

10. The apparatus of claim 1, further comprising a management interface.

11. A non-transitory, computer readable medium having instructions stored thereon, wherein the instructions, when executed, causes at least one processor to:

track a Media Access Control identifier used within a network;

direct network traffic to one or more paths associated with the Media Access Control identifier;

measure a bit rate passing through the paths associated with the Media Access Control identifier;

adjust the bit rate allowed to pass through the paths using a traffic control engine that comprises a first path of the one or more paths and a second path of the one or more paths; and sort the network traffic in the first path into one or more queues based at least on one or more Internet Protocol addresses associated with the network traffic.

12. The non-transitory, computer readable medium of claim 11, wherein the first path is capable of transporting incoming network traffic and the second path is capable of transporting outgoing network traffic.

13. The non-transitory, computer readable medium of claim 11, wherein the instructions when executed, causes the at least one processor to sniff and filter network traffic in the second path.

14. The non-transitory, computer readable medium of claim 11, wherein the instructions when executed, causes the at least one processor to compile reports on the network traffic associated with the Media Access Control identifier.

15. The non-transitory, computer readable medium of claim 11, wherein the instructions when executed, causes the at least one processor to apply a rolling quota to each of the paths.

16. A method for managing local devices, the method comprising:

tracking a Media Access Control identifier used within the network;

directing network traffic to one or more paths associated with the Media Access Control identifier;

measuring a bit rate passing through the paths associated with the Media Access Control identifier;

adjusting the bit rate allowed to pass through the paths using a traffic control engine that comprises a first path of the one or more paths and a second path of the one or more paths; and sorting the network traffic in the first path into one or more queues based at least on one or more Internet Protocol addresses associated with the network traffic.

17. The method of claim 16, wherein the first path is capable of transporting incoming network traffic and the second path is capable of transporting outgoing network traffic.

18. The method of claim 16, further comprising sniffing and filtering the network traffic in the second path.

19. The method of claim 16, further comprising compiling reports on the network traffic associated with the Media Access Control identifier.

20. The method of claim 16, further comprising apply a rolling quota to each of the paths.

* * * * *